(12) United States Patent
Heydt et al.

(10) Patent No.: US 7,432,677 B2
(45) Date of Patent: Oct. 7, 2008

(54) CLOSED-LOOP ROTATIONAL CONTROL OF A BRUSHLESS DC MOTOR

(75) Inventors: Jeffrey A. Heydt, Longmont, CO (US); James W. DuLaney, Jr., Shakopee, MN (US); David R. Street, Allen, TX (US); Nicholas Swezey, Bartlesville, OK (US); Stuart Kevin Francis, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 613 days.

(21) Appl. No.: 11/014,348

(22) Filed: Dec. 16, 2004

(65) Prior Publication Data

US 2006/0132070 A1   Jun. 22, 2006

(51) Int. Cl.
   *H02P 6/00*   (2006.01)
(52) U.S. Cl. .................. 318/400.01; 318/700; 318/701; 318/400.13; 318/400.14
(58) Field of Classification Search ................ 318/254, 318/138, 439, 778, 90, 400.01, 700, 701, 318/810, 807; 388/800, 825, 842, 848
   See application file for complete search history.

(56) References Cited

U.S. PATENT DOCUMENTS

| | | | | |
|---|---|---|---|---|
| 4,876,491 | A | | 10/1989 | Squires et al. |
| 5,117,165 | A | | 5/1992 | Cassat et al. |
| 5,298,838 | A | * | 3/1994 | Peters et al. ........... 318/400.32 |
| 5,319,289 | A | * | 6/1994 | Austin et al. .......... 318/400.14 |
| 5,497,326 | A | * | 3/1996 | Berland et al. ................ 701/36 |
| 5,590,235 | A | * | 12/1996 | Rappenecker et al. ....... 388/803 |
| 5,592,058 | A | * | 1/1997 | Archer et al. .......... 318/400.09 |
| 5,631,999 | A | * | 5/1997 | Dinsmore .................. 388/805 |
| 5,703,449 | A | | 12/1997 | Nagate et al. |
| 5,777,448 | A | | 7/1998 | Matsui |
| 5,780,983 | A | | 7/1998 | Shinkawa et al. |
| 5,793,558 | A | | 8/1998 | Codilian et al. |
| 5,814,965 | A | * | 9/1998 | Randall ..................... 318/701 |
| 5,841,252 | A | | 11/1998 | Dunfield |
| 5,859,518 | A | * | 1/1999 | Vitunic ..................... 318/701 |
| 5,870,363 | A | | 2/1999 | Sun et al. |
| 5,929,577 | A | | 7/1999 | Neidorff et al. |
| 5,963,706 | A | | 10/1999 | Baik |
| 5,982,571 | A | | 11/1999 | Calfee et al. |
| 5,998,946 | A | * | 12/1999 | Kim .......................... 318/254 |
| 6,078,158 | A | | 6/2000 | Heeren et al. |
| 6,100,656 | A | | 8/2000 | El-Sadi et al. |

(Continued)

*Primary Examiner*—Rita Leykin
(74) *Attorney, Agent, or Firm*—David K. Lucente (57) ABSTRACT

Method and apparatus for controlling a brushless dc motor, such as the type used in a data storage device to rotate data storage media. A sequence of drive pulses is applied to rotate the motor. The sequence is switched from first to second motor commutation states at a time determined in relation to changes in elapsed time between successive pulses in the sequence. Each drive pulse has a duration established in relation to an inductance of the motor, and is separated from adjacent pulses by an intermediate delay of predetermined value. A peak elapsed time interval between successive pulses is identified, and the next commutation state is switched in at a selected time after the peak time interval. The sequence preferably accelerates the motor from rest to an intermediate velocity, after which back electromotive force (bemf) commutation is used to accelerate the motor to a final operational velocity.

19 Claims, 5 Drawing Sheets

FIG. 6

U.S. PATENT DOCUMENTS

| | | | |
|---|---|---|---|
| 6,160,367 A * | 12/2000 | Higashi et al. | 318/254 |
| 6,178,060 B1 | 1/2001 | Liu | |
| 6,249,101 B1 | 6/2001 | Viti et al. | |
| 6,316,895 B1 * | 11/2001 | Ramarathnam | 318/400.02 |
| 6,337,548 B2 | 1/2002 | Kawabata et al. | |
| 6,340,873 B2 | 1/2002 | Seki et al. | |
| 6,344,721 B2 | 2/2002 | Seki et al. | |
| 6,396,229 B1 | 5/2002 | Sakamoto et al. | |
| 6,541,936 B2 | 4/2003 | Viti | |
| 6,577,088 B2 * | 6/2003 | Heydt et al. | 318/400.34 |
| 6,710,567 B2 * | 3/2004 | Heydt et al. | 318/560 |
| 2001/0011877 A1 * | 8/2001 | Lelkes et al. | 318/700 |

* cited by examiner

CLOSED-LOOP ROTATIONAL CONTROL OF A BRUSHLESS DC MOTOR

FIELD OF THE INVENTION

The claimed invention relates generally to the field of electrical motors and more particularly, but not by way of limitation, to an apparatus and method for accelerating a brushless direct current (dc) motor from rest to an intermediate velocity.

BACKGROUND

Brushless direct current (dc) motors are used in a variety of applications, such as to rotate a data storage medium in a data storage device. Brushless dc motors, also referred to as spindle motors, include one or more phase windings and a corresponding array of permanent magnets. Current is selectively applied to the phase windings to establish magnetic fields which interact with the magnets to induce rotation of the motor.

A series of commutation states are defined for different mechanical alignments of the phase windings and the magnets. The motor is commutated by selectively switching the particular phase windings to which current is sourced and from which current is sunk as the motor rotates through these commutation states.

Back electromotive force (bemf) commutation can be employed to control the motor at higher operational velocities. As those skilled in the art will recognize, bemf commutation relies on sensing the bemf generated in the phase windings as a result of motor rotation. Commutation states are changed in relation to zero crossing points of the voltage on non-energized phase windings.

At lower intermediate motor velocities, the interaction between the phase windings and the magnets may be insufficient to permit bemf control to accelerate and maintain rotation of the motor. Accordingly, various approaches have been proposed in the art to accelerate a spindle motor from rest to an intermediate velocity, after which a hand-off takes place to transfer operational control to bemf circuitry which continues the acceleration of the motor to the final operational velocity.

While operable, there remains a continued need for improvements in the art whereby a spindle motor can be effectively controlled in a closed-loop fashion, such as but not limited to acceleration to an intermediate velocity for bemf commutation hand-off.

SUMMARY OF THE INVENTION

As embodied herein and as claimed below, the present invention is generally directed to an apparatus and method for controlling a brushless dc motor, such as the type used in a data storage device to rotate data storage media.

The method preferably comprises applying a sequence of drive pulses to rotate the motor, and switching the sequence of drive pulses from a first commutation state to a second commutation state of the motor at a time determined in relation to changes in elapsed time between successive pulses in said sequence. Preferably, the method comprises applying the sequence of drive pulses to accelerate the motor from rest to an intermediate velocity, although such is not limiting.

The drive pulses are preferably applied during the applying step to respective phase windings of the motor in a selected commutation sequence using an array of switching devices.

Each of the drive pulses in the sequence of drive pulses of the applying step has a duration established in relation to an inductance of the motor, and is separated from adjacent pulses by an intermediate delay of predetermined value.

The applying step further preferably comprises monitoring a magnitude of current flowing through the motor, comparing said magnitude to a current limit threshold value and truncating each said drive pulse in relation to said comparing step.

The applying step further preferably comprises determining each of a plurality of successive elapsed times for a corresponding plurality of the drive pulses, and identifying a peak elapsed time in said plurality of successive elapsed times. The applying step further preferably comprises timing the switching from the first commutation state to the second commutation state in relation to said peak elapsed time.

The method further preferably comprises using back electromotive force (bemf) control to accelerate the motor from the intermediate velocity to a final velocity.

The apparatus preferably comprises a motor control block configured to apply a continuous sequence of drive pulses to rotate a brushless dc motor. The motor control block switches application of the sequence of drive pulses from a first commutation state to a second commutation state of the motor at a time determined in relation to changes in elapsed time between successive pulses in said sequence.

Preferably, the motor control block is further configured to use the sequence of drive pulses to accelerate the motor from rest to an intermediate velocity, and then accelerate the motor from the intermediate velocity to a final operational velocity using back electromotive force (bemf) commutation. The motor control block preferably comprises a plurality of switching devices through which the sequence of drive pulses is applied to respective phase windings of the motor.

As before, each of the drive pulses in the sequence of drive pulses has a duration that is preferably established in relation to an inductance of the motor, and wherein said drive pulses are separated by an intermediate delay of predetermined value.

The motor control block further preferably operates to monitor a magnitude of current flowing through the motor, compare said magnitude to a current limit threshold value and truncate each said drive pulse in relation thereto. Each of a plurality of successive elapsed times for a corresponding plurality of the drive pulses are preferably measured, and a peak elapsed time in said plurality of successive elapsed times is preferably identified. The motor control block further preferably times the switching from the first commutation state to the second commutation state in relation to said peak elapsed time.

In this way, faster and more efficient closed-loop acceleration of the motor can be achieved, reducing the potential for inadvertently rotating the motor in the wrong direction and fluctuations in current consumption of the motor from a power supply.

These and various other features and advantages which characterize the claimed invention will become apparent upon reading the following detailed description and upon reviewing the associated drawings.

DETAILED DESCRIPTION

Figure 1:
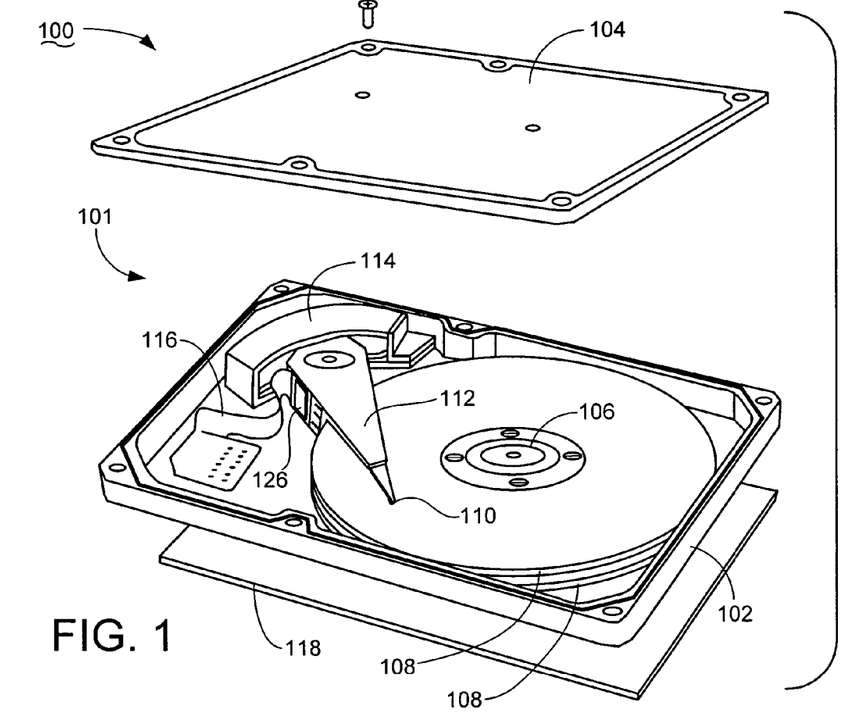
FIG. 1 is an exploded, perspective view of a data storage device constructed in accordance with preferred embodiments of the present invention.

While the claimed invention has utility in any number of different applications, FIG. 1 has been provided to illustrate a particularly suitable environment in which the claimed invention can be advantageously practiced.

FIG. 1 shows an exploded, perspective top plan representation of a data storage device 100 of the type used to magnetically store and retrieve computerized user data. The device 100 includes a sealable housing 101 formed from a base deck 102 and a top cover 104.

The housing 101 provides a controlled interior environment for various constituent components of the device 100, including a brushless direct current (dc) motor 106. The motor 106, also referred to herein as a spindle motor, is used to rotate a number of data storage media 108. The motor 106 is preferably characterized as a three phase, three-input y-connected motor which rotates the media 108 at a constant angular velocity (CAV) during device operation, although such is not limiting.

The media 108 are preferably characterized as magnetic recording discs to which data are stored and from which data are retrieved by an array of data transducing heads 110. The heads 110 are supported by a rotary actuator 112 and moved across the media surfaces by a voice coil motor (VCM) 114.

A flex circuit 116 establishes electrical communication paths between the actuator 112 and control circuitry on a printed circuit board (PCB) 118 mounted to the underside of the base deck 102.

Figure 2:
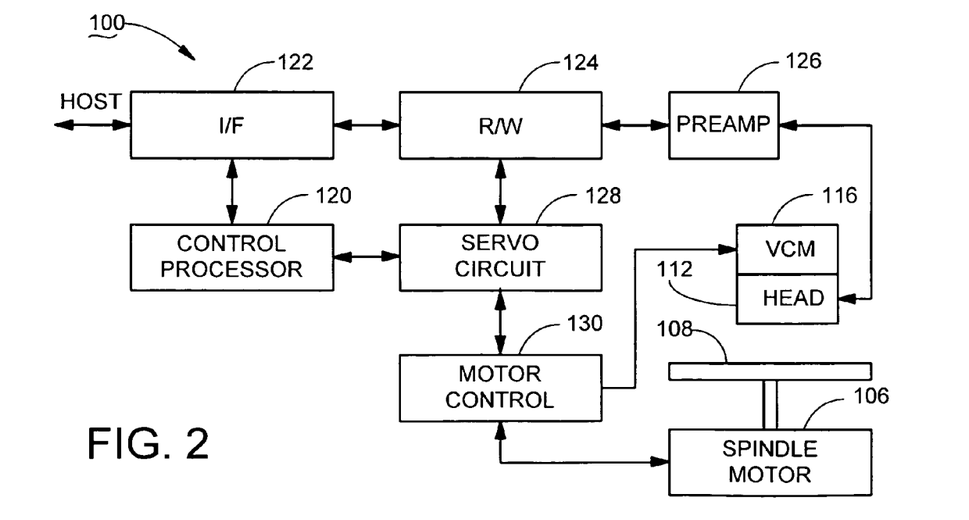
FIG. 2 is a functional block diagram of control circuitry of the device of FIG. 1.

FIG. 2 provides a functional block diagram of the device of FIG. 1. A control processor 120 provides top level control for the device. A data communication path between the media 108 and a host device (such as a personal computer, PC) is established by a hardware interface (I/F) circuit 122, a read/write (R/W) channel 124 and a preamplifier/driver (preamp) circuit 126. The preamp 126 is preferably mounted to the actuator 112, as shown in FIG. 1.

Closed loop servo control of the heads 110 is provided by a servo circuit 128, which outputs current commands to a motor control block 130. The motor control block 130 includes a VCM driver (not shown) which applies current to the VCM 114 to move the heads 110 to the desired position adjacent the media 110. The motor control block 130 further includes circuitry to control the operation of the spindle motor 106, as will now be discussed.

Figure 3:
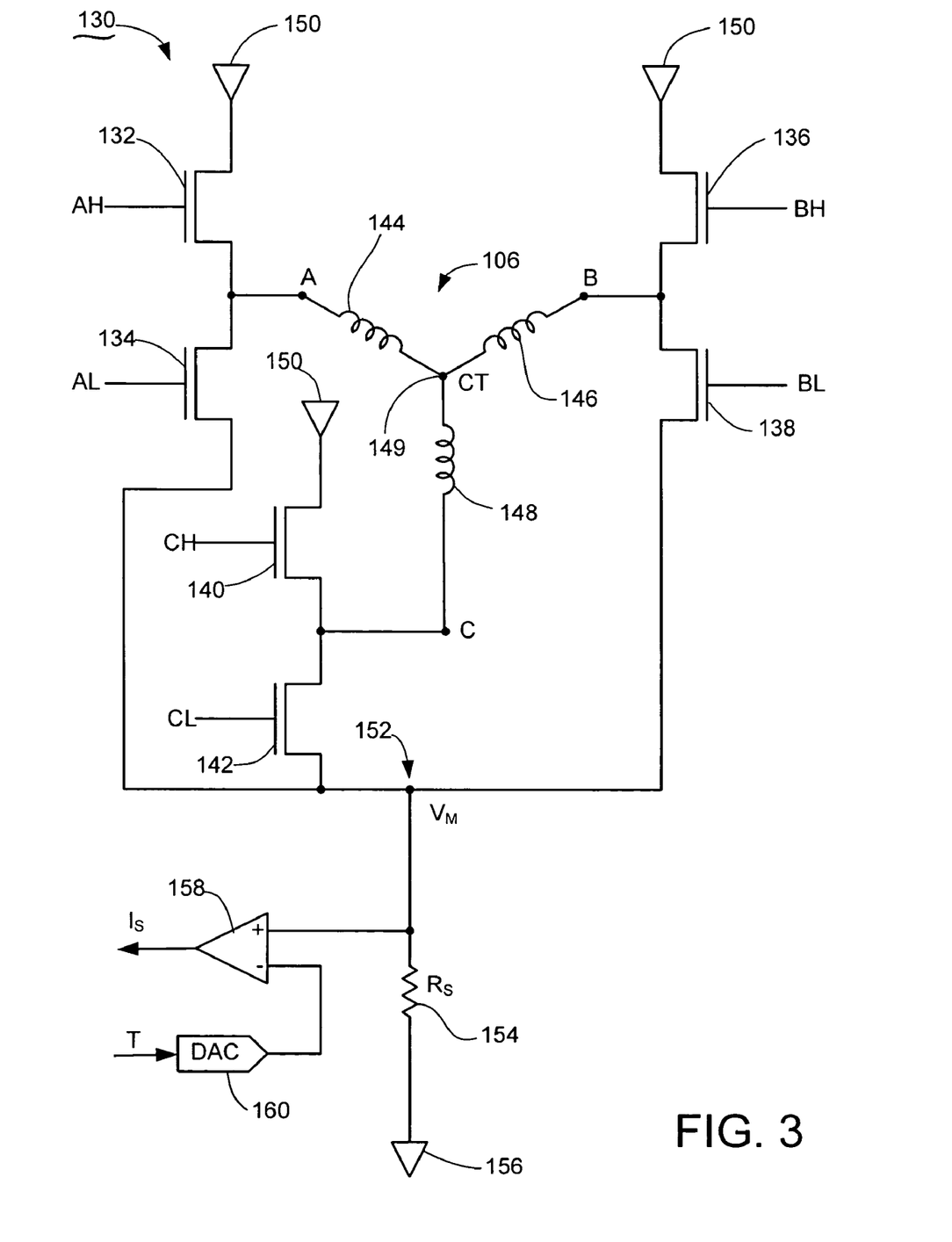
FIG. 3 provides a schematic diagram of relevant portions of the motor control circuitry shown in FIG. 2.

As shown in FIG. 3, the motor control block 130 preferably includes six switching devices characterized as field effect transistors (FETs) 132, 134, 136, 138, 140 and 142. The FETs include inputs (gates) that are respectively identified as AH (A high), AL (A low), BH, BL, CH and CL to correspond to A, B and C phase windings 144, 146 and 148 of the motor 106. A center tap node (CT) 149 internally connects the respective phase windings.

Controlled, timed application of drive pulses to the various FETs 132, 134, 136, 138, 140 and 142 result in flow of current from a voltage source 150, through the A, B and C phase windings 144, 146 and 148 to a VM node 152, through a current sense resistor ($R_S$) 154 and to a reference line 156 (e.g., ground). Spindle motor commutation states are defined in Table I:

TABLE 1

| Commutation State | Source Phase | Sink Phase | Phase Held at High Impedance |
|---|---|---|---|
| 1 | A | B | C |
| 2 | A | C | B |
| 3 | B | C | A |
| 4 | B | A | C |
| 5 | C | A | B |
| 6 | C | B | A |

Each cycle through the six commutation states of Table 1 represents one electrical revolution of the motor 106. Depending on the construction of the motor 106, there will be a multiple number of electrical revolutions (e.g., six) in each complete mechanical revolution of the motor 106.

The voltage at the $V_M$ node 152 corresponds to the magnitude of current passing through the motor, and is supplied to the +input of amplifier 158. A digital current limit threshold value T is converted to a corresponding analog voltage by a digital to analog converter (DAC) 160, and this analog voltage is supplied to the −input of the amplifier 158. A current sense value $I_S$ is provided by the amplifier 158 when the voltage at the $V_M$ node 152 reaches the threshold value T.

A pulse width modulation (PWM) type approach is preferably used to control the application of current to the motor 106. For Commutation State 1 from Table 1, the AH FET 132 and the BL FET 138 are activated and the remaining FETs remain off so as to source current to A phase 144 and sink current from phase B 146. The high side AH FET 132 is preferably left continuously on and the low side BL FET 138 is preferably cycled in relation to the output of the amplifier 158. In this way, the current passing through the motor 106 is established in relation to the threshold value T and the voltage at $V_M$ node 152.

Figure 4:
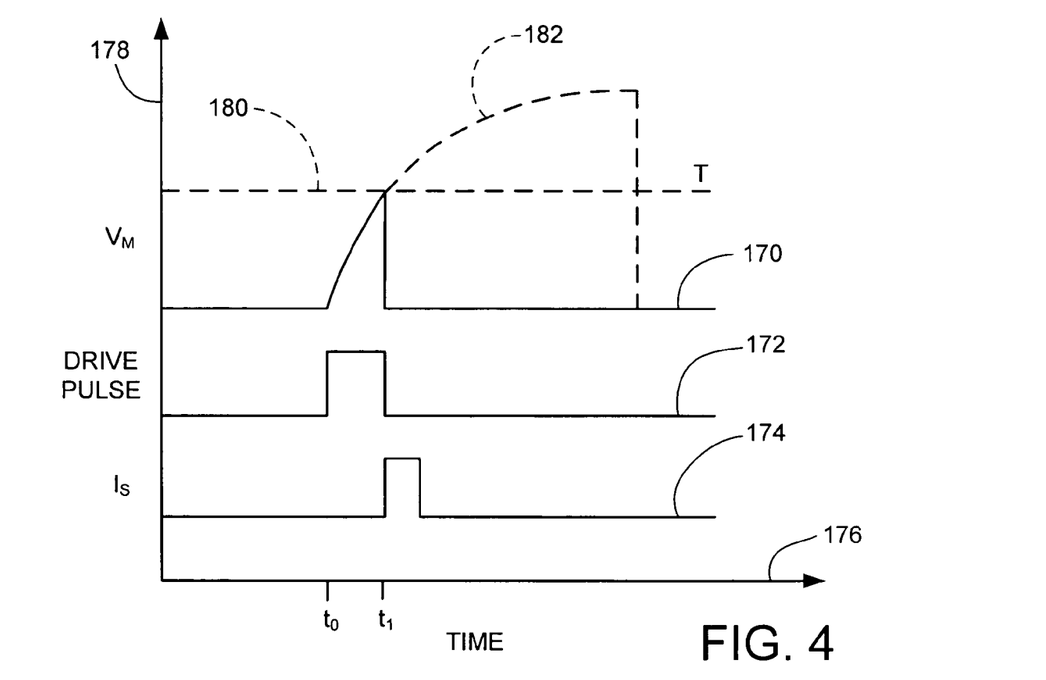
FIG. 4 is a graphical representation of a sensed voltage induced by a drive pulse applied to the motor by the circuit of FIG. 3.

FIG. 4 provides a generalized graphical depiction of a sense voltage curve 170, a drive pulse curve 172 and a current sense signal 174, plotted against an elapsed time x-axis 176 and a common amplitude y-axis 178. At time $t_0$, the respective FETs are activated to initiate current flow through the motor 106 as depicted by curve 172. In response, the voltage at $V_M$ node 152 will begin to rise in relation to the inductance of the motor 106 as shown by curve 170. The inductance of the motor 106 will vary in relation to the electrical position of the motor.

At time $t_1$, the voltage at $V_M$ node 152 reaches the threshold value T (denoted by broken line 180), at which point the drive pulse is truncated (curve 172) and a current sense pulse $I_s$ is output (signal 174). For clarity, the remaining shape of the voltage $V_M$ after time $t_1$ is shown in FIG. 4 in broken line fashion at 182 to illustrate what voltage would have continued to have been observed at the $V_M$ node 152 had the pulse not been truncated.

Figure 5:
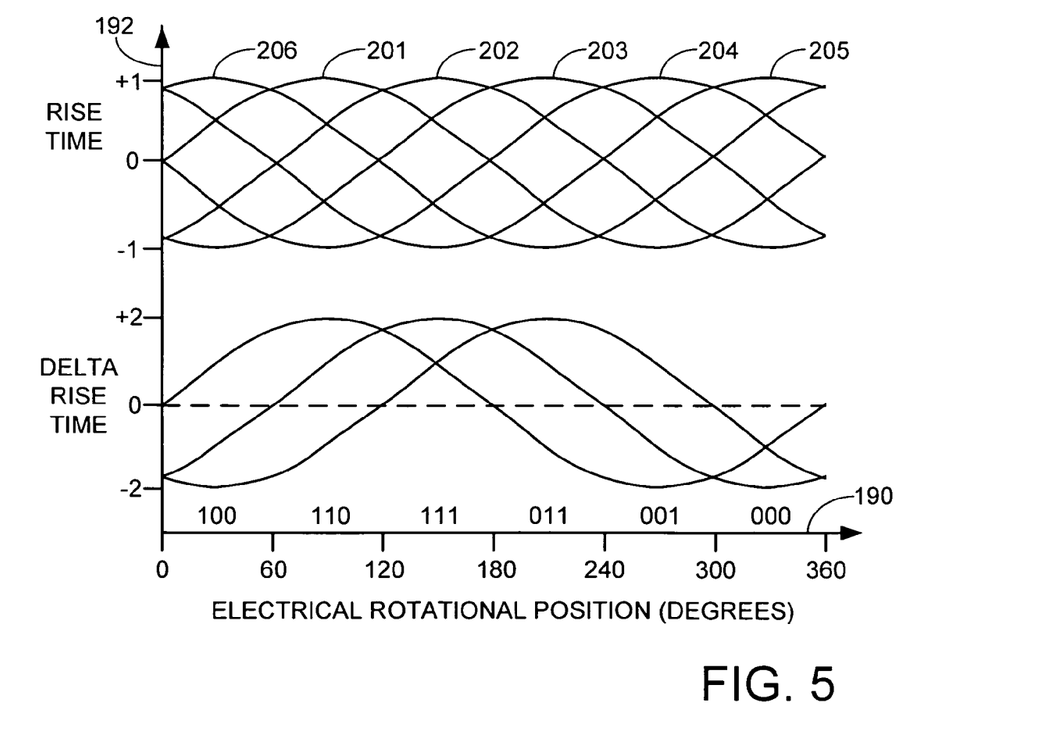
FIG. 5 graphically depicts rise times versus electrical position and changes in such rise times for different commutation states of the motor of FIG. 1.

FIG. 5 provides a number of rise time curves for the motor 106 plotted against an electrical rotational position (in degrees) x-axis 190 and a common amplitude y-axis 192. Substantially sinusoidal rise time curves 201, 202, 203, 194, 195 and 196 are normalized over a range of from −1 to +1 and correspond to the respective commutation states of Table 1 as follows: curve 201 corresponds to Commutation State 1, curve 202 corresponds to Commutation State 2, and so on.

The curves are complementary in nature: state 1 (curve 201) is the complement of state 4 (curve 204); state 2 (curve 202) is the complement of state 5 (curve 205); and state 3 (curve 203) is the complement of state 6 (curve 206).

The differences in rise times between each pair of complementary states are depicted in FIG. 5 by curves 208, 210 and 212. Curve 208 represents the difference between curves 201 and 204 (states 1 and 4); curve 210 represents the difference between curves 202 and 205 (states 2 and 5) and curve 212 represents the difference between curves 203 and 206 (states 3 and 6).

The electrical position of the spindle motor 106 can thus be expressed as a three-digit binary number corresponding to the polarities of the curves 208, 210 and 212. For example, in the first zone in which the electrical position of the motor is between 0 and 60 degrees, the curves 208, 210 and 212 have respective values of (1,0,0); that is, curve 208 has a positive value greater than zero (and is hence assigned a logical value of 1) and the curves 210, 212 each have a negative value less than zero (and are each assigned a logical value of 0).

As the motor rotates to the next electrical position between 60 and 120 degrees, the delta curve 210 transitions from negative to positive so that the curves 208, 210 and 212 have respective values of (110). It can be seen that as the motor continues to rotate through the respective electrical rotational positions, one of the values in the three-bit binary representation will transition from a zero to a one or vice versa at each transition. In this way, the respective polarities of the curves 208, 210 and 212 can be referenced to identify the respective electrical rotational alignment of the motor 106.

Figure 6:
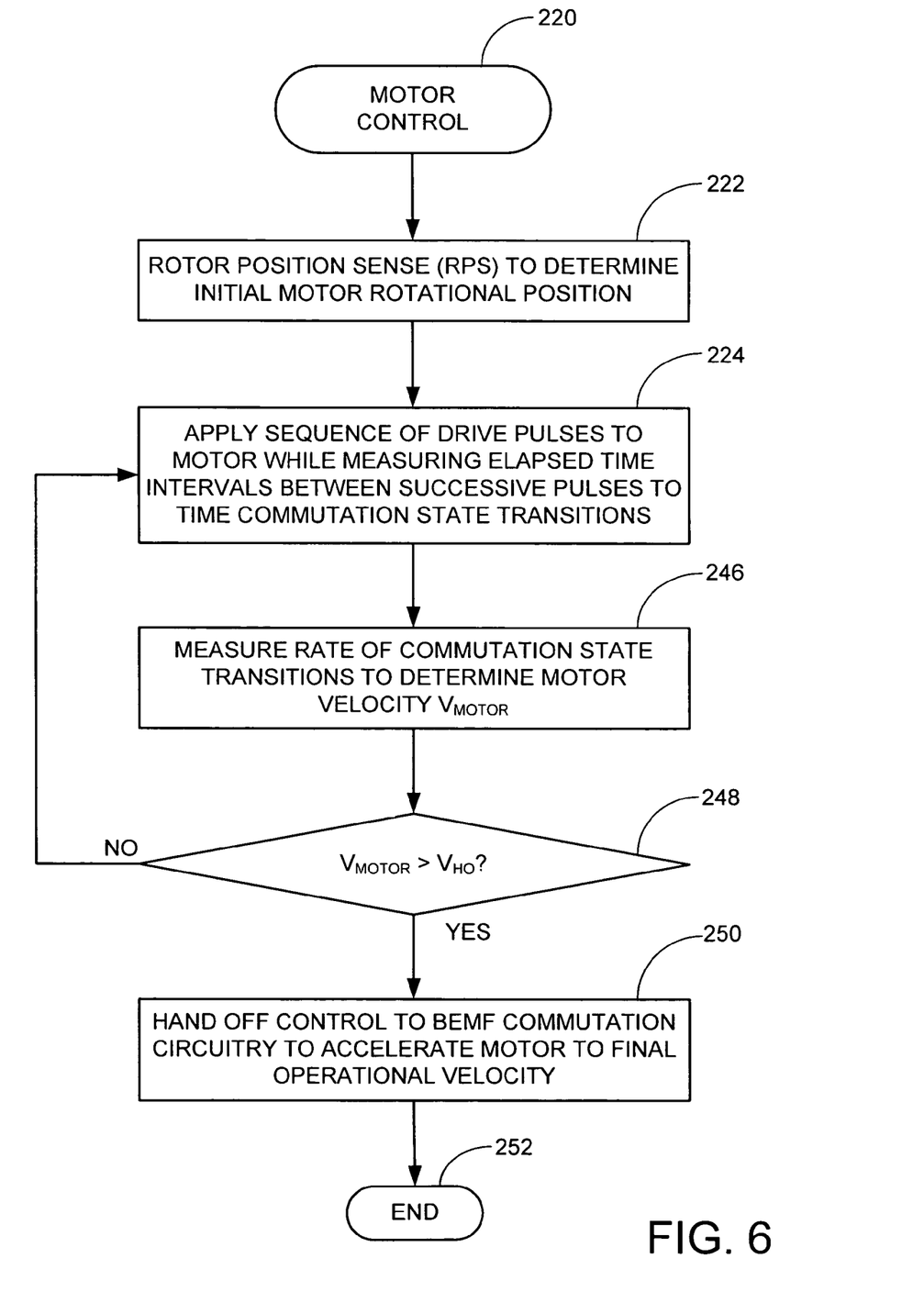
FIG. 6 is a flow chart for a MOTOR CONTROL routine illustrative of steps carried out in accordance with preferred embodiments of the present invention to rotate the motor of FIG. 1.

Reference is now made to FIG. 6 which provides a flow chart for a MOTOR CONTROL routine 220. The routine is illustrative of steps carried out by the device 100 to control rotation of the motor 106 in accordance with preferred embodiments of the present invention. It is contemplated that the routine is preferably carried out to accelerate the motor 106 from rest to the final operational velocity at which data can be transduced to and from the media 108 by the heads 110, but such is not necessarily limiting to the scope of the claims set forth below.

At step 222, a rotor position sense (RPS) operation is first carried out to determine the initial electrical position of the motor 106. Preferably, low current magnitude pulses are applied to each of the commutation states of Table 1 in turn; for example, for state 1 the AH FET 132 and BL FET 138 are activated and the rise time between time $t_0$ and $t_1$ is measured as discussed above in FIG. 4.

This is repeated to obtain corresponding rise time measurements for each of the remaining states. The respective rise time values are normalized and combined in accordance with FIG. 5, resulting in identification of the initial electrical rotational position of the motor 106.

Once the initial position of the motor 106 is known, the routine passes to step 224 wherein a sequence of drive pulses is applied to the motor 106 to initiate acceleration of the motor in the desired direction. The sequence is continuously applied to the motor in a closed-loop fashion.

To better explain the operation of step 224 in FIG. 6, it will be contemplated for the present example that the motor 106 was determined in step 222 to be aligned with commutation state 1. Thus, the continuous sequence of drive pulses begins with activation of the AH FET 132 and BL FET 138 in FIG. 3. The resulting current flow through the motor will induce a voltage rise at $V_M$ node 152 in relation to the inductance of the motor.

When the voltage at $V_M$ node 152 reaches the threshold value T (as signaled by the amplifier 158 in FIG. 3), the BL FET 138 is preferably temporarily turned off for a preselected time, allowing the voltage at $V_M$ node 152 to begin to decay. After this preselected time, the BL FET 138 is turned on again, causing the voltage at VM node 152 to again increase up to the threshold value T and the process is repeated. This modulation results in the continuous sequence of drive pulses that are applied to the motor 106, one such pulse from this sequence being represented by curve 172 in FIG. 4.

Generally, it has been found that as a motor rotates through a given commutation state, the effective inductance of the motor will start at a first nominal value, will generally increase to a peak value, and then will decrease back down to a second nominal value. The higher the inductance, generally the longer the rise time will be for the voltage $V_M$ to reach the threshold value T.

Thus, the drive pulses will not generally tend to have the same duration, but will rather have respectively different pulse lengths in relation to changes in the inductance of the motor 106.

Accordingly, as further shown by step 224, the motor control block 130 operates to monitor the elapsed times between successive pulses in the drive pulse sequence and switch to the next commutation state in relation to changes in these elapsed times. This operation can be more clearly understood with reference to FIG. 7, which provides generalized representations of a motor current curve 226, a drive pulse sequence curve 228, a current limit detect curve 230 and an accumulated time interval curve 232. Each of these curves is plotted against a common elapsed time x-axis 234 and a common amplitude y-axis 236.

Figure 7:
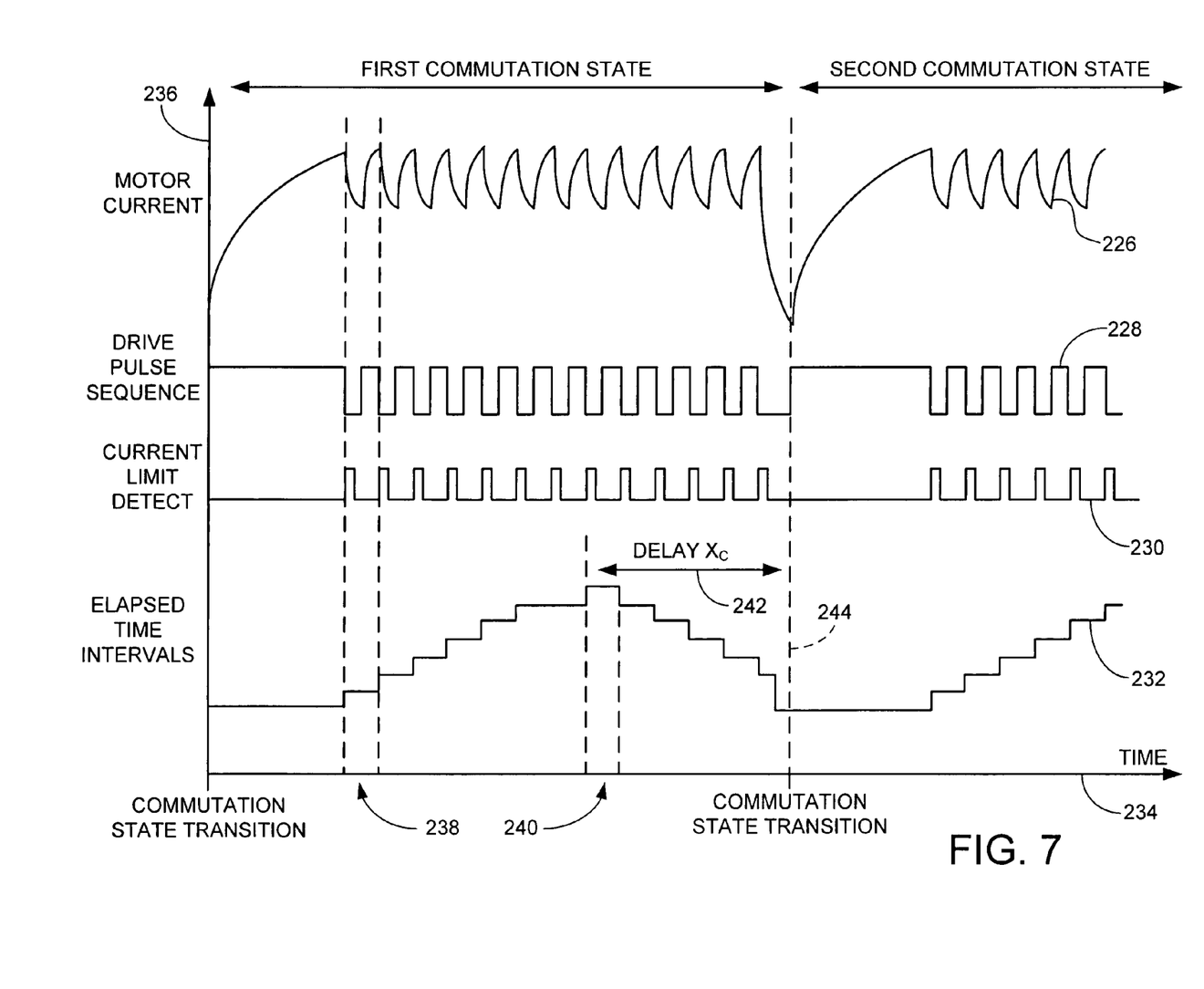
FIG. 7 graphically illustrates motor current, current sense and rise times obtained during the routine of FIG. 6.

The motor current curve 226 is provided with a substantially curvilinear, saw-tooth shape, with rising portions corresponding to increases in current and decaying portions corresponding to decreases in current in response to the drive pulse sequence 228.

The current limit detect curve 230 represents a sequence of fixed duration pulses. These pulses are preferably triggered by the $I_S$ pulse (FIGS. 3 and 4) and can signal a timer (not shown) used to establish the aforementioned predefined time interval before the low-side FET is reactivated. The pulses from curve 230 are also preferably used to measure the elapsed time intervals between successive pulses, as shown by a first time interval 238 in curve 232.

The time intervals of curve 230 are shown to generally increase in magnitude until a peak interval 240 is reached, after which the intervals generally decrease. The actual variations in rise time intervals are exaggerated somewhat in FIG. 7 for clarity of illustration. To make the detection of the peak interval more robust, filtering techniques (such as calculation of a rolling average of the respective interval values) are preferably applied to the time interval measurements to analyze the trend, reject spurious samples and better identify the peak interval 240.

Once the peak has been identified, preferably another timer or similar mechanism (not shown) is initiated to establish a commutation delay $X_C$, arrow 242. The delay $X_C$ generally comprises a time period from the peak interval 240 to the next commutation state transition. The delay $X_C$ will generally not constitute a fixed value, but rather represents, for example, selected a percentage of the entire elapsed time during which the motor passes through each commutation state.

The delay $X_C$ will depend on the construction characteristics of the motor, and can be empirically determined as a function of motor velocity or can be derived on-the-fly based on, for example, the magnitudes of the intervals measured during each commutation state. Preferably, the delay XC is selected so that the transition is made to the next state at a point at which at least as much torque can be applied to the motor in the new state as is currently being applied in the existing state.

The motor control block 130 transitions to the next state at broken line 244 (in this case, from state 1 to state 2). This is preferably carried out by maintaining the AH FET 132 in an active state, deactivating the BL FET 138 and activating the CL FET 142. Note that the sequence of drive pulses 228 continues to be applied across this state transition, and no delays or coasting periods are encountered that significantly interrupt the sequence as the transition boundary is crossed.

Returning again to the flow of FIG. 6, the motor control block 130 concurrently monitors the velocity of the motor, $V_{MOTOR}$ at step 246. The $V_{MOTOR}$ value can be determined in a number of ways such as, for example, by monitoring the rate at which successive commutation state transitions (e.g., 244) are encountered during the operation of step 224.

The $V_{MOTOR}$ value is compared to a hand-off velocity $V_{HO}$ as shown by decision step 248, with the $V_{HO}$ value preferably indicative of an intermediate velocity of the motor 106 at which bemf control hand-off is appropriate. The operation of steps 224 and 246 continues until the motor reaches this intermediate velocity, after which bemf circuitry of the motor control block 130 takes over at step 250. The bemf circuitry continues motor acceleration from the intermediate velocity to the final operational velocity of the motor 106, and the bemf circuitry maintains operation of the motor at the operational velocity until the device 100 is deactivated or the spindle motor 106 is otherwise turned off, at which point the routine ends at step 252.

It will now be appreciated that the various preferred embodiments presented herein provide advantages over the prior art. The continuous application of drive pulses during motor acceleration can significantly decrease the time required to get the motor up to the desired velocity. Risks of rotating the motor in the wrong rotational direction are substantially eliminated due to the closed loop control provided by the routine of FIG. 6. Moreover, applying substantially continuous current to the motor provides substantially improved power supply performance, since large swings in current consumption levels (such as during coasting periods to measure rotational position) are reduced.

While the foregoing embodiments have generally been directed to using a sequence of drive pulses to accelerate a motor, such is not limiting. Rather, the foregoing embodiments can readily be configured to control the rotation of a motor in accordance with any desired rotational profile such as, for example, rotating constant linear velocity (CLV) media such as optical discs. Moreover, the foregoing embodiments can further be adapted to any number of applications in which a brushless dc motor is employed, not just data storage device environments.

It will now be appreciated that preferred embodiments are generally directed to an apparatus and method for controlling a brushless dc motor (such as 106).

The method preferably comprises applying a sequence of drive pulses (such as 228) to rotate the motor (such as by 224), wherein the sequence of drive pulses is switched from a first commutation state to a second commutation state of the motor (such as at 244) at a time determined in relation to changes in elapsed time between successive pulses in said sequence (such as 232, 240, 242). Preferably, the method comprises using the sequence of drive pulses to accelerate the motor from rest to an intermediate velocity (such as by 248).

The drive pulses are preferably applied during the applying step to respective phase windings (such as 144, 146 and 148) of the motor in a selected commutation sequence using an array of switching devices (such as 132, 134, 136, 138, 140 and 142).

Each of the drive pulses in the sequence of drive pulses of the applying step has a duration established in relation to an inductance of the motor, and is separated from adjacent pulses by an intermediate delay of predetermined value.

The applying step further preferably comprises monitoring a magnitude of current flowing through the motor (such as by 152), comparing said magnitude to a current limit threshold value (such as by 158, 160) and truncating each said drive pulse in relation to said comparing step.

The applying step further preferably comprises determining each of a plurality of successive elapsed times for a corresponding plurality of the drive pulses (such as 232), and identifying a peak elapsed time in said plurality of successive elapsed times (such as 240). The applying step further preferably comprises timing the switching from the first commutation state to the second commutation state in relation to said peak elapsed time (such as 242).

The method further preferably comprises using back electromotive force (bemf) control to accelerate the motor from the intermediate velocity to a final velocity (such as by 250).

The apparatus preferably comprises a motor control block (such as 130) configured to apply a sequence of drive pulses (such as 228) to rotate a brushless dc motor (such as 106). The motor control block switches application of the sequence of drive pulses from a first commutation state to a second commutation state of the motor (such as at 244) at a time determined in relation to changes in elapsed time between successive pulses in said sequence (such as 232, 240, 242).

Preferably, the motor control block uses the sequence of drive pulses to accelerate the motor from rest to an intermediate velocity (such as by 248), and then accelerate the motor from the intermediate velocity to a final operational velocity using back electromotive force (bemf) commutation (such as by 250). The motor control block preferably comprises a plurality of switching devices (such as 132, 134, 136, 138, 140 and 142) through which the continuous sequence of drive pulses is applied to respective phase windings (such as 144, 146, 148) of the motor.

As before, each of the drive pulses in the sequence of drive pulses has a duration that is preferably established in relation to an inductance of the motor, and wherein said drive pulses are separated by an intermediate delay of predetermined value.

The motor control block further preferably operates to monitor a magnitude of current flowing through the motor (such as at 152), compare said magnitude to a current limit threshold value (such as 158, 160) and truncate each said drive pulse in relation thereto. Each of a plurality of successive elapsed times for a corresponding plurality of the drive pulses are preferably measured (such as 232), and a peak elapsed time in said plurality of successive elapsed times is preferably identified (such as at 240). The motor control block further preferably times the switching from the first commutation state to the second commutation state in relation to said peak elapsed time (such as by 242).

For purposes of the appended claims, the recited first means will be understood consistent with the foregoing discussion to correspond to the disclosed motor control block 130 of FIG. 2 and FIG. 3, which operates in accordance with the flow chart of FIG. 6 and the diagrams of FIG. 7. With regard to the first means, structures that fail to continuously apply drive pulses to the motor and instead invoke coasting periods during which rotational position measurements are taken to detect the next commutation state transition are expressly excluded as an equivalent. Structures that employ external sensors such as Hall effect devices to indicate rotational position are further expressly excluded as an equivalent.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the housing without departing from the spirit and scope of the present invention.

In addition, although the embodiments described herein are directed to the acceleration of a spindle motor in a data storage device, it will be appreciated by those skilled in the art that the claimed subject matter is not so limited, but rather extends to any number of different applications.

What is claimed is:

1. A method comprising applying a sequence of drive pulses to rotate a brushless dc motor, wherein the sequence of drive pulses is switched from a first commutation state to a second commutation state of the motor at a time determined in relation to changes in elapsed time between successive pulses in said sequence.

2. The method of claim 1, wherein the applying step comprises using the sequence of drive pulses to accelerate the motor from rest to an intermediate velocity.

3. The method of claim 1, wherein the drive pulses are applied during the applying step to respective phase windings of the motor in a selected commutation sequence using an array of switching devices.

4. The method of claim 1, wherein each of the drive pulses in the sequence of drive pulses of the applying step has a duration established in relation to an inductance of the motor.

5. The method of claim 4, wherein each of the drive pulses in the sequence of drive pulses of the applying step are further separated by an intermediate delay of predetermined value.

6. The method of claim 1, wherein the applying step further comprises monitoring a magnitude of current flowing through the motor, comparing said magnitude to a current limit threshold value, and truncating each said drive pulse in relation to said comparing step.

7. The method of claim 1, wherein the applying step further comprises determining each of a plurality of successive elapsed times for a corresponding plurality of the drive pulses, and identifying a peak elapsed time in said plurality of successive elapsed times.

8. The method of claim 7, wherein the applying step further comprises timing the switching from the first commutation state to the second commutation state in relation to said peak elapsed time.

9. The method of claim 8, wherein the applying step further comprises filtering the successive elapsed times.

10. The method of claim 1, further comprising a step of subsequently using back electromotive force (bemf) control to rotate the motor.

11. An apparatus comprising a motor control block configured to apply a sequence of drive pulses to rotate a brushless dc motor, wherein the motor control block switches application of the sequence of drive pulses from a first commutation state to a second commutation state of the motor at a time determined in relation to changes in elapsed time between successive pulses in said sequence.

12. The apparatus of claim 11, wherein the motor control block applies the sequence of drive pulses to accelerate the motor from rest to an intermediate velocity.

13. The apparatus of claim 12, wherein the motor control block is further configured to accelerate the motor from the intermediate velocity to a final operational velocity using back electromotive force (bemf) commutation.

14. The apparatus of claim 11, wherein the motor control block comprises a plurality of switching devices through which the continuous sequence of drive pulses is applied to respective phase windings of the motor.

15. The apparatus of claim 11, wherein each of the drive pules in the sequence of drive pulses has a duration established in relation to an inductance of the motor, and wherein said drive pulses are separated by an intermediate delay of predetermined value.

16. The apparatus of claim 11, wherein the motor control block is further configured to monitor a magnitude of current flowing through the motor, compare said magnitude to a current limit threshold value, and truncate each said drive pulse in relation thereto.

17. The apparatus of claim 11, wherein the motor control block is further configured to measure each of a plurality of successive elapsed times for a corresponding plurality of the drive pulses, and to identify a peak elapsed time in said plurality of successive elapsed times.

18. The apparatus of claim 17, wherein the motor control block is further configured to time the switching from the first commutation state to the second commutation state in relation to said peak elapsed time.

19. An apparatus comprising a brushless dc motor and first means for rotating the motor by applying a sequence of drive pulses and by switching application of said sequence from a first commutation state to a second commutation state at a time determined in relation to changes in elapsed time between successive pulses in said sequence.

* * * * *